Figure 1:
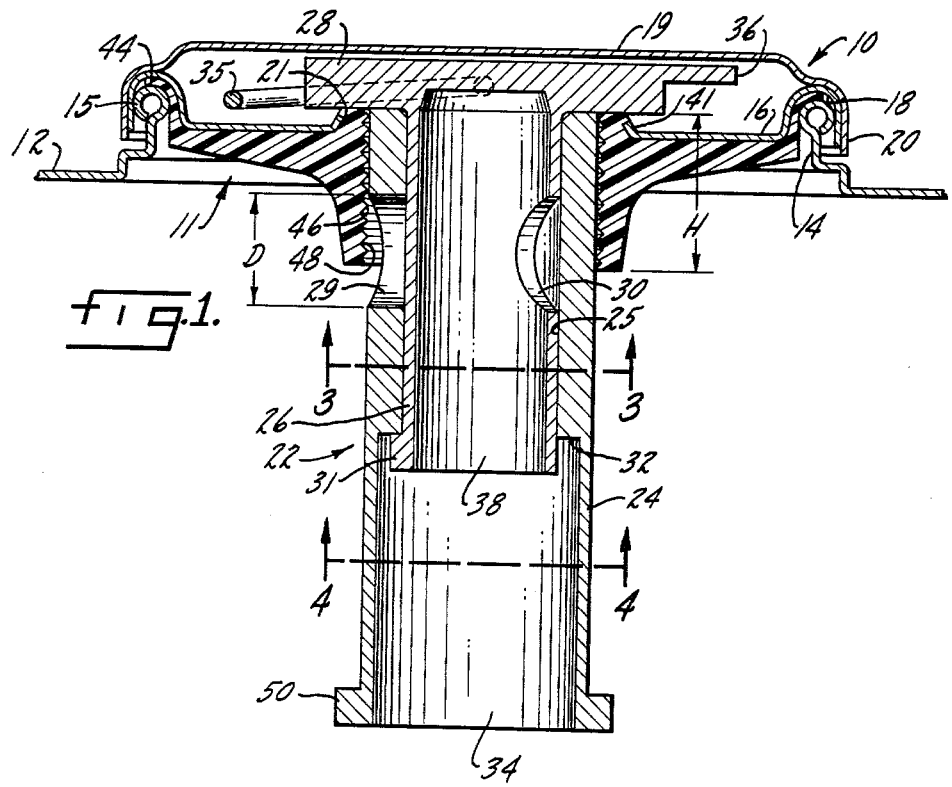

March 1, 1966

L. A. N. BIJVOET ETAL 3,237,818

TAP CLOSURE

Filed Oct. 3, 1963

INVENTOR.
Leonardus Arnoldus Nicolaas Bijvoet
BY
Wolfe, Hubbard, Voit & Osann
Attorneys.

United States Patent Office 3,237,818
Patented Mar. 1, 1966

3,237,818
TAP CLOSURE
Leonardus A. N. Bijvoet, Overveen, North-Holland, Netherlands, assignor to Inland Steel Company, Chicago, Ill., a corporation of Delaware
Filed Oct. 3, 1963, Ser. No. 313,517
Claims priority, application Germany, Oct. 5, 1962, H 42,824
3 Claims. (Cl. 222—522)

The present invention relates generally to containers and, more particularly, to an improved container closure and sealing arrangement therefor. In its principal aspects, the invention is concerned with an improved extensible tap closure assembly of the type particularly suitable for use with drums or other similar containers.

The problem of providing an effective, yet practical, closure for containers of the type employing extensible taps is one that heretofore has been particularly troublesome to the container industry. One approach to the problem has involved the use of an elastic ring which is clamped between the container cover and a ring-shaped disc with the elastic ring defining a guide for the extensible tap tube. However, this approach has not provided a satisfactory solution to the problem for a number of reasons. For example, because of the numerous closure components employed (e.g., the container wall, cover, ring-shaped disc, tap tube, and elastic ring), difficulties have been encountered both in attaining and maintaining an effective liquid-tight closure. Thus, such conventional constructions are generally subjected to leakage in at least three spaced areas where the various components are joined. Moreover, such conventional extensible tap closures also present problems in manufacturing and assembly.

It is a general aim of the present invention to provide an improved container tap closure assembly which overcomes all of the foregoing disadvantages and which not only enhances the liquid-tight integrity of the container, but which is also characterized by its simpilicity and reliability in operation.

Another object of the invention is the provision of an extensible tap closure assembly formed of relatively few component pieces and which, therefore, is characterized by having fewer and less extensive areas requiring seals to form a liquid-tight container.

In another of its important aspects, it is an object of the invention to provide an improved tap closure assembly that requires only a single sealing element which also serves as an elongate guide for the extensible tap tube.

An ancillary object of the invention is the provision of a single element formed of a material resistant to corrosive and aggressive fluids and which is coextensive with the inner surface of the cover for the tap closure, thus protecting the cover from the fluid contents of the container while at the same time forming both a seal for the tap closure and a guide for the tap tube.

Another object of the invention is to provide an extensible tap closure which permits of ease and economy in manufacture and which is relatively simple to assemble, yet which is characterized by its ruggedness.

Figure 2:
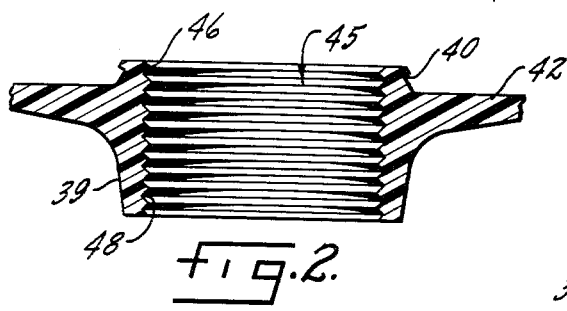
Figure 4:
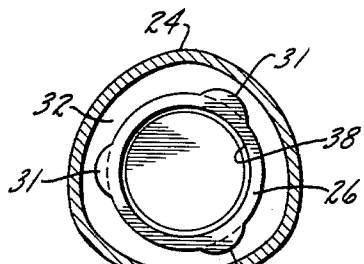
Figure 3:
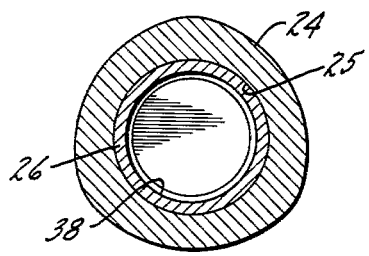

Other objects and advantages of the invention will become apparent as the following description proceeds, taken in conjunction with the accompanying drawing, in which:

FIGURE 1 is a fragmentary vertical section of a portion of a container here illustrating an exemplary extensible tap closure assembly embodying the features of the present invention with the closure assembly shown in the closed position and mounted in the wall of a container;

FIG. 2 is a fragmentary vertical section of the guide sleeve shown in FIG. 1, here with the tap tube removed; and, FIGS. 3 and 4 are sectional views taken substantially along the respective lines 3—3 and 4—4 of FIG. 1.

While the invention is susceptible of various modifications and alternative constructions, a specific embodiment thereof has been shown by way of example in the drawing and will herein be described in detail. It should be understood, however, that it is not intended to limit the invention to the particular form disclosed, but, on the contrary, the intention is to cover all modifications, equivalents and alternative constructions falling within the spirit and scope of the invention as expressed in the appended claims.

Referring more specifically to FIG. 1, there is illustrated an exemplary tap closure assembly, generally indicated at 10, embodying the features of the present invention. As here shown, the tap closure assembly is mounted within an opening 11 formed in the wall 12 of a drum or similar container. The opening 11 which accommodates the assembly 10 is, in a conventional manner, defined by an upstanding tubular portion 14 of the container wall 12 with the outermost extremity of the tubular portion being curled to form a generally annular bead 15.

For the purpose of closing the container after the latter has been filled, the exemplary closure assembly 10 includes a cover or lid 16 which may, merely by way of example, be formed of sheet metal. In the illustrative container closure, the outermost peripheral edge of the cover 16 is formed into a generally inverted U-shaped channel 18 dimensioned to overlie and substantially encompass the annular bead 15 on the container wall. If desired, a seal cap 19 having an annular skirt 20 may be applied to the closure assembly 10 with the skirt 20 extending around and engaging the peripheral edge of the cover 16. The arrangement is such that the cover 16 and seal cap 19 may be readily secured to the container wall 12 in a tamperproof manner well known to those skilled in the art by the simple expedient of rolling, turning, or otherwise bending the lowermost marginal edges of the skirt 20 and cover channel 18 inwardly beneath, and in snug engagement with, the lower surfaces of the bead 15.

In order to permit dispensing of the contents of the container after removal of the seal cap 19, the cover 16 is generally annular in shape and defines a centrally disposed aperture 21 within which is positioned an extensible tap generally indicated at 22. The tap 22 includes a tap tube 24 having a cylindrical bore 25 formed therein for rotatably and telescopically receiving a hollow cylindrical plug 26, the latter being closed at its outermost end (e.g., the uppermost end in FIG. 1) by an integral end plate 28. While the tap tube 24 and plug 26 are capable of relative rotational movement for the purpose of registering discharge apertures 29, 30 formed in the respective sidewalls thereof, relative axial movement of the two elements is inhibited by providing a plurality of radially outwardly projecting lugs or stops 31 (FIGS. 1 and 4) formed on the innermost end of the plug 26—the stops positioned to engage a radial shoulder 32 formed in the tube 24 at the junction of the bore 25 and a counterbore 34.

A handle 35 in the form of a C-shaped bail is pivotally secured to the plate 28 and is selectively used by the operator to pull the plug 26 and tube 24 to their outermost extended position (not shown). The handle 35 may also be used to effect relative rotational movement between the tube 24 and plug 26 for the purpose of aligning the discharge apertures 29, 30 respectively formed therein. Alternatively, relative rotation between the tap tube 24 and plug 26 can be effected by means of a projecting grip or lever 36 formed on one edge of the end plate 28. Thus, when the tap is pulled outwardly to its extended position and the discharge apertures 29, 30 are aligned, the container contents may be dispensed through the open passageway defined by the counterbore 34, a bore 38 formed in the hollow plug 26, and the then aligned apertures 29, 30.

In accordance with one of the important aspects of the present invention, there is provided a novel guide which serves to simultaneously guide the tap 22 during selective vertical movement thereof and to effect a liquid-tight seal between the container wall 12 and the tap 22. In the exemplary form of the invention, the guide takes the form of a sleeve 39 formed of any suitable synthetic material such, merely by way of example, as a thermoplastic material. The sleeve 39 is formed with a circumferential ridge 40 (FIG. 2) adjacent its outermost extremity, and is positioned within the opening 21 formed in the cover 16. The arrangement is such that when the sleeve 39 is assembled with the cover 16, the former is inserted into the opening 21 in the latter with the ridge 40 protruding through and snapping over an upstanding flange 41 on the inner marginal edge of the cover 16, thus securely affixing the sleeve to the cover.

In carrying out the present invention, the sleeve 39 includes an integral annular plate-like flange 42 which extends radially outwardly from the body of the sleeve intermediate its opposite extremities. The flange 42 is formed in such a manner that when the sleeve 39 and cover 16 are assembled, the flange is contiguous to and coextensive with the inner surface of the cover 16. In this manner, the flange 42, which is preferably made of a synthetic material resistant to aggressive fluids, serves to protect the cover 16 from the contents of the container.

In keeping with one of the principal objectives of the invention, the outermost peripheral edge of the flange 42 is shaped to conform with and extend into the channel 18 formed on the cover 16. As a consequences of this construction, when the cover 16 (and seal cap 19 if provided) is secured to the container wall 12 by bending the lower marginal edge of the channel 18 beneath the bead 15, the outermost edge 44 of the flange 42 is clamped between the channel 18 and bead 15, thus providing an effective liquid-tight seal at the junction of the cover 16 and container wall 12. At the same time, the inner surface wall 45 of the sleeve 39 provides an effective liquid-tight seal between the sleeve 39 and the outer surface of the tap tube 24 which is slidably positioned in the sleeve.

If desired, the liquid-tight seal between the relatively slidable sleeve 39 and tap tube 24 may be further enhanced by forming the inner surface wall 45 of the sleeve with a plurality of alternating annular ridges 46 and grooves 48, as best shown in FIG. 2. Thus, the ridges 46, which are formed of synthetic material such as a thermoplastic material, tend to slidably and resiliently engage the tap tube 24, thereby increasing the specific pressure along spaced annular lines and enhancing the quality of the seal.

It will be appreciated from the foregoing that the unitary sleeve 39 and flange 42 serves a number of important functions. Thus, the sleeve defines a relatively long guide surface for the tap 22, thereby confining the latter and insuring that it is moved in an axial direction. Additionally the unitary sleeve and flange provides effective liquid-tight seals at the junction of the cover 16 to the wall 12 and the tap 22. Moreover, the unitary sleeve and flange serves to protect the interior surface of the cover from attack by aggressive fluids contained in the container. In addition, the unitary nature of the sleeve and flange greatly facilitates both manufacture and assembly of the tap closure assembly and insures relatively accurate centering of the peripheral edge 44 of the flange with respect to the container bead 15.

Pursuant to the invention, the sleeve serves yet another important function—namely, that of preventing accidental spillage of the contents of the container during periods when the tap 22 is partially extended. To accomplish this, the axial height H of the sleeve 39 is selected greater than the diameter D of the discharge aperture 29 in the tap tube 24. This insures that no through discharge passage can be formed in the closure assembly unless the aperture 30 in the plug 26 is registered with the aperture 29 in the tube 24. Absent this particularly dimensional relationship, it would be possible to accidentally spill the container contents through the aperture 29 even when the hollow plug 26 is closed.

It will be noted upon inspection of FIGS. 3 and 4 conjointly, that the tap tube 24 is preferably cam-shaped in cross-section (i.e., other than round) and adapted to be inserted into a hollow sleeve 39 having a correspondingly shaped bore (not shown in detail). While this construction is not essential to the invention, it is desirable in that it provides a non-rotatable sealed coupling between the tube 24 and the sleeve 39. Thus, when the handle 35 or lever 36 are operated, only the plug 26 rotates. If desired, a stop 50 can be positioned on the lower end of the tube 24 so as to cooperate with the lower extremity of the sleeve 39 and thus limit axial movement of the tap 22.

I claim as my invention:

1. A tap closure for a container of the type having a tubular portion projecting outwardly from the container wall, said closure comprising, in combination, a cover having a central opening formed therein, a guide formed of synthetic material mounted on said cover, said guide having an axially elongate tubular sleeve coaxial with the opening in said cover and an integral flange coextensive with and contiguous with the inner surface of said cover, said sleeve projecting outwardly through the opening in said cover, a circumferentially disposed, resiliently deformable ridge formed in the outer extremity of said sleeve, said resiliently deformable ridge adapted to snap over the inner marginal edge of said cover for rigidly securing said guide to said cover and precluding relative axial movement therebetween, and an extensible tap positioned in said sleeve with freedom for selective axial movement relative thereto, said tap being sealingly engaged with the inner surface wall of said sleeve.

2. A tap closure for a container of the type having a tubular portion projecting outwardly from the container wall, said closure comprising, in combination, a cover having a central opening formed therein, a guide formed of synthetic material mounted on said cover, said guide having an axially elongate tubular sleeve coaxial with the opening in said cover and an intergral flange coextensive with and contiguous with the inner surface of said cover, a hollow tap tube slidably mounted within said sleeve for selectable relative axial movement therein, cooperating stop means formed on said tube and said sleeve for limiting inward and outward axial movement of the tube relative to the sleeve, a laterally directed discharge aperture formed in said tube, said aperture being smaller than the axial height of said sleeve and being positioned in said tube so that the aperture is totally covered by said sleeve when said tube is disposed in its axially inward limit position relative to said sleeve and uncovered by said sleeve when said tube is disposed in its axially outer limit position relative to said sleeve, said tube being sealingly engaged with the inner surface wall of said sleeve.

3. A tap closure as set forth in claim 2 further characterized in that the inner surface wall of said sleeve is formed with a plurality of alternate annular grooves and ridges.

References Cited by the Examiner

UNITED STATES PATENTS

| | | | |
|---|---|---|---|
| 1,734,232 | 11/1929 | Ryan et al. | 222—519 |
| 1,924,057 | 8/1933 | Draper et al. | 222—522 X |
| 1,927,122 | 9/1933 | Horner et al. | 222—519 |
| 2,735,566 | 2/1956 | Bramming | 222—545 X |
| 2,752,066 | 6/1956 | Ayers | 222—549 X |
| 2,772,037 | 11/1956 | Rieke | 222—522 X |
| 2,774,523 | 12/1956 | Rieke | 222—525 |
| 2,819,001 | 1/1958 | Pottle | 222—566 |
| 2,992,761 | 7/1961 | Sommers | 222—525 |

FOREIGN PATENTS 381,646   10/1932   Great Britain.

LOUIS J. DEMBO, *Primary Examiner.*

RAPHAEL M. LUPO, *Examiner.*